United States Patent
Poor

(10) Patent No.: US 10,259,080 B1
(45) Date of Patent: Apr. 16, 2019

(54) ADAPTIVE GUIDE BUSHING FOR LASER TUBE CUTTING SYSTEMS

(71) Applicant: Vactronix Scientific, LLC, Fremont, CA (US)

(72) Inventor: Michael Poor, Fremont, CA (US)

(73) Assignee: Vactronix Scientific, LLC, Fremont, CA (US)

(*) Notice: Subject to any disclaimer, the term of this patent is extended or adjusted under 35 U.S.C. 154(b) by 628 days.

(21) Appl. No.: 14/262,643

(22) Filed: Apr. 25, 2014

Related U.S. Application Data

(60) Provisional application No. 61/816,406, filed on Apr. 26, 2013.

(51) Int. Cl.
*B23K 26/02* (2014.01)
*B23K 26/30* (2014.01)

(52) U.S. Cl.
CPC ............ *B23K 26/422* (2013.01); *B23K 26/02* (2013.01)

(58) Field of Classification Search
CPC ........................... B23K 37/04; B23K 37/0426; B23K 37/0435; B23K 37/0452; B23K 37/053; B23K 37/0531; B23K 26/38; B23K 26/422; B23K 26/02; B23K 26/10; B23K 26/0823
USPC ............ 219/121.67, 121.68, 121.69, 121.82, 219/121.84; 83/54, 196, 949, 950
See application file for complete search history.

(56) References Cited

U.S. PATENT DOCUMENTS

| | | | | |
|---|---|---|---|---|
| 2,339,986 A | * | 1/1944 | Engert | B23Q 16/02 269/152 |
| 3,773,262 A | * | 11/1973 | Sparling | B23K 5/003 239/291 |
| 5,852,277 A | * | 12/1998 | Gustafson | B23K 26/0823 219/121.67 |
| 7,476,034 B2 | * | 1/2009 | Shedlov | F16C 13/04 384/549 |
| 8,076,609 B2 | | 12/2011 | Oberg | 219/121.67 |
| 2006/0264906 A1 | * | 11/2006 | Pal | A61M 25/0009 604/523 |

FOREIGN PATENT DOCUMENTS

| | | | | |
|---|---|---|---|---|
| CN | 102794596 | | 11/2012 | ........... B23K 37/053 |
| DE | 4124546 | * | 1/1993 | ............ B23K 26/08 |
| JP | 56-062692 | | 5/1981 | ............ B23K 31/00 |
| RU | 2 279 840 | | 3/2005 | ............ A44C 17/00 |
| RU | 2 302 933 | | 7/2007 | ........... B23K 37/053 |

OTHER PUBLICATIONS

International Search Report issued in a corresponding foreign application, PCT/U52015/027783, pp. 1-3 (dated Aug. 6, 2015).
Written Opinion issued in a corresponding foreign application, PCT/US2015/027783, pp. 1-3 (dated Aug. 6, 2015).
EP Extended Search Report and Search Opinion based on PCT/US20150227783, EP App. 15783805.3, pp. 1-5, (dated Dec. 18, 2017).

* cited by examiner

*Primary Examiner* — Alexander M Valvis
*Assistant Examiner* — Christopher R Dandridge
(74) *Attorney, Agent, or Firm* — David G. Rosenbaum; Benjamin D. Rotman; Rosenbaum IP, P.C.

(57) ABSTRACT

An adaptive guide bushing for laser tube cutting systems, the adaptive guide bushing including an elastic material that expands and contracts to hold tubing within a central opening.

12 Claims, 18 Drawing Sheets

US 10,259,080 B1

ADAPTIVE GUIDE BUSHING FOR LASER TUBE CUTTING SYSTEMS

CROSS-REFERENCE TO RELATED APPLICATIONS

The present application claims priority to U.S. Provisional Patent Application Ser. No. 61/816,406, filed Apr. 26, 2013, which is hereby incorporated by reference in its entirety.

BACKGROUND

The invention generally relates to laser cutting systems.

The accuracy and quality of a laser cut in tubing is greatly influenced by how well the tubing coaxially fits within the guide bushing. If the fit is too tight, the friction between the tubing and the bushing will introduce errors in laser cuts, which can be seen in the form of distortions in the shape of the final cut, especially at small radii. If the fit is too loose, errors such as thin and thick struts or unexpected steps in the cutting will result. Without a proper guide, a laser system cannot achieve the tight tolerances demanded by the small feature sizes used in medical devices.

The present invention solves these problems as well as others.

SUMMARY OF THE INVENTION

Provided herein are systems, methods, and apparatuses for an adaptive guide bushing for laser tube cutting systems.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
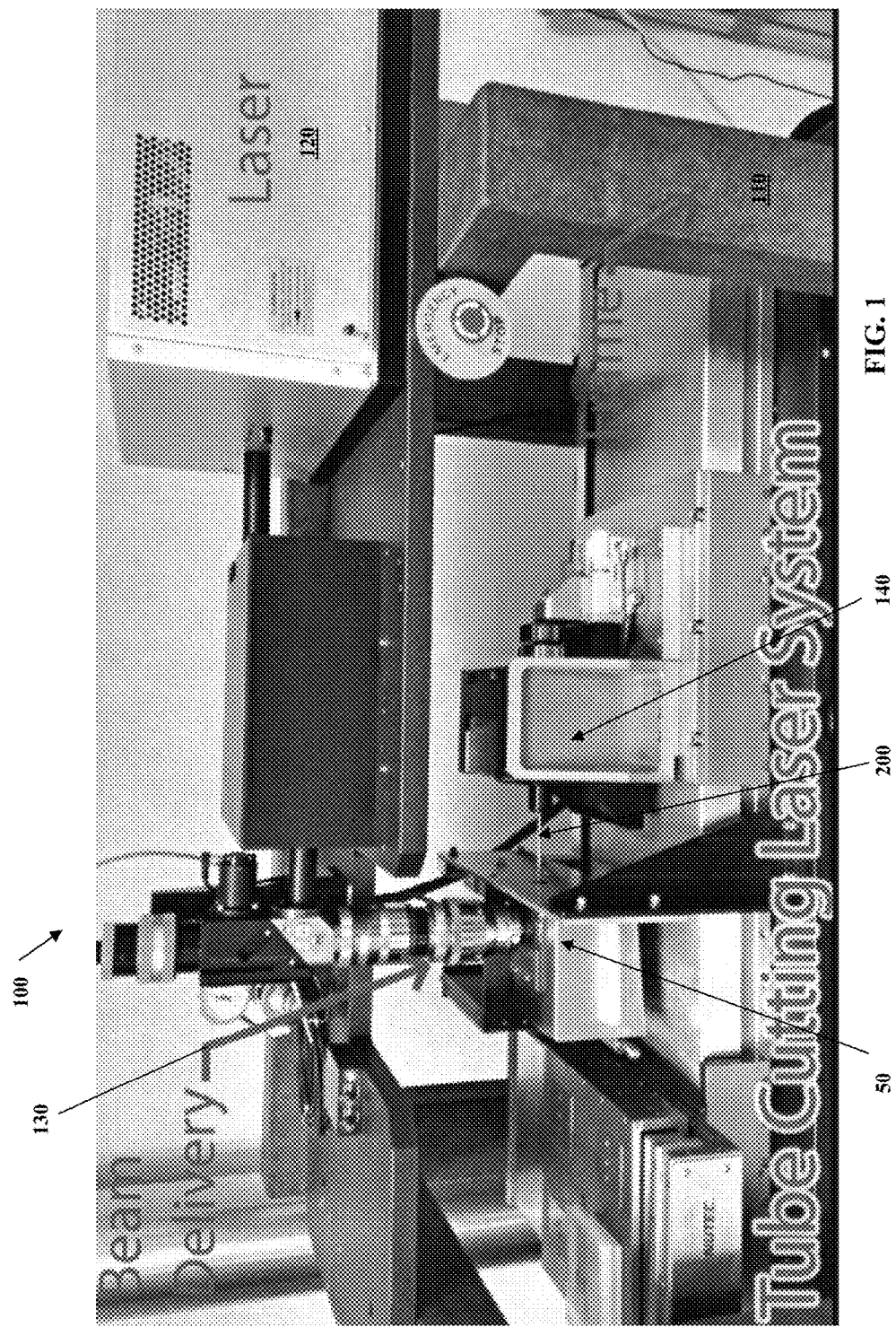
FIG. 1 is a photograph of a tube cutting laser system.
Figure 2:
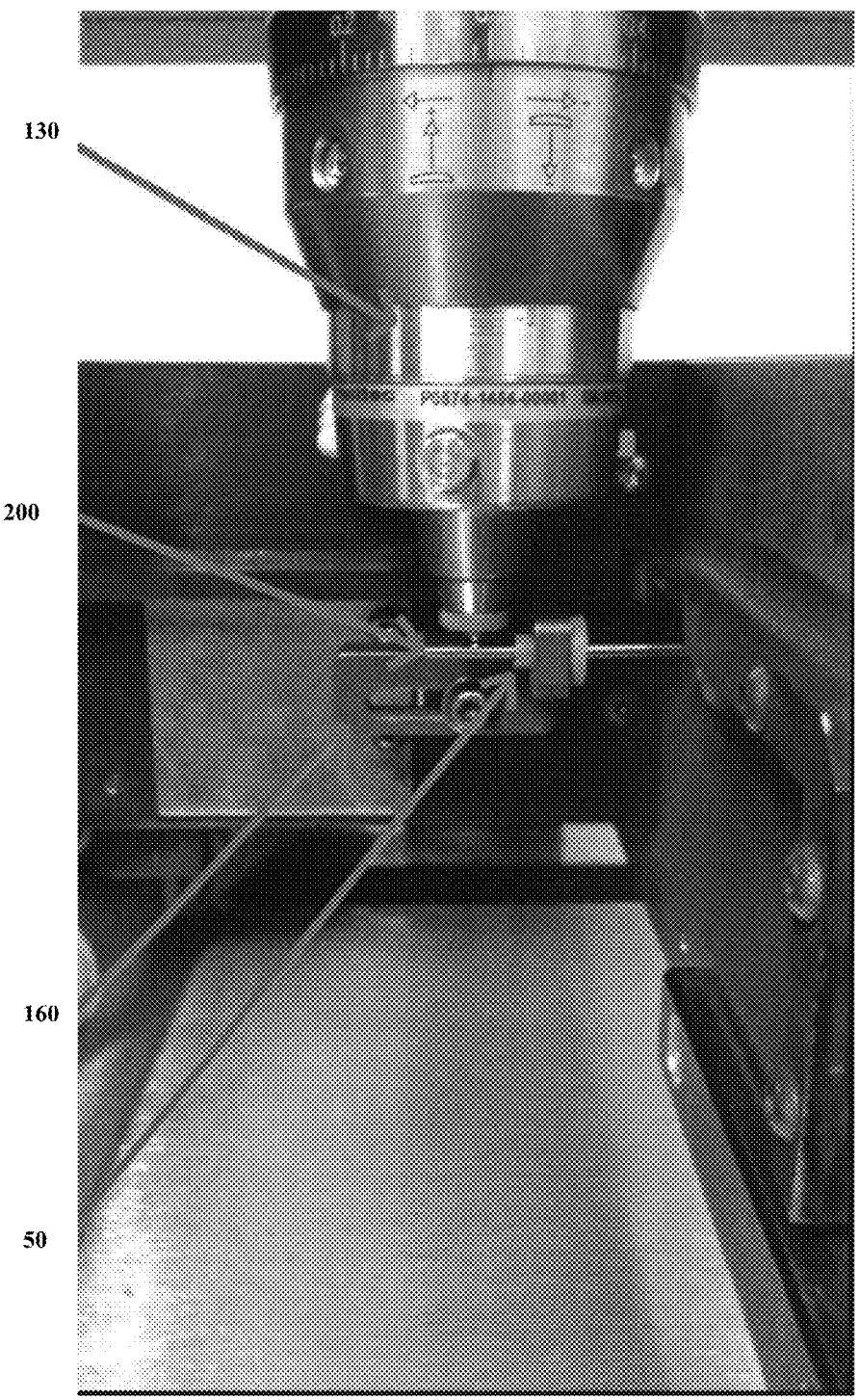
FIG. 2 is a photograph of a beam delivery system and a guide bushing operably coupled with the tube cutting laser system of FIG. 1.

Generally speaking, a tube cutting laser system is a tool used for cutting medical devices, tubes, and other components that require high accuracy and repeatability. As shown in FIG. 1, the tube cutting laser system 100 generally comprises a frame 110, a laser 120 operably coupled to the frame 110, a beam delivery fixture 130 operably coupled to the laser 120, a motion system 140 operably coupled to the beam delivery fixture 130, and a guide bushing 50 operably coupled with the motion system 140 and the beam delivery fixture 130, as shown in FIG. 2. The guide bushing 50 serves to hold a tubing 200 steady as it is being cut by the laser 120 through the beam delivery fixture 130. The accuracy and quality of the laser cut is greatly influenced by how well the tubing 200 coaxially fits within the guide bushing 50. If the fit is too tight, the friction between the tubing 200 and the guide bushing 50 will introduce errors in laser cuts, which can be seen in the form of distortions in the shape of the final cut, especially at small radii. If the fit is too loose, errors such as thin and thick struts or unexpected steps in the cutting will result. Without a proper guide, a laser system cannot achieve the tight tolerances demanded by the small feature sizes used in medical devices. Traditional stent cutting systems hold tolerances of +/−0.0005" on even relatively simple geometry. The present system and method of holding the material being cut with an adjustable elastic ring allows the same laser cutting system to hold tolerances of +/−0.00005" and better.

Figure 3A:
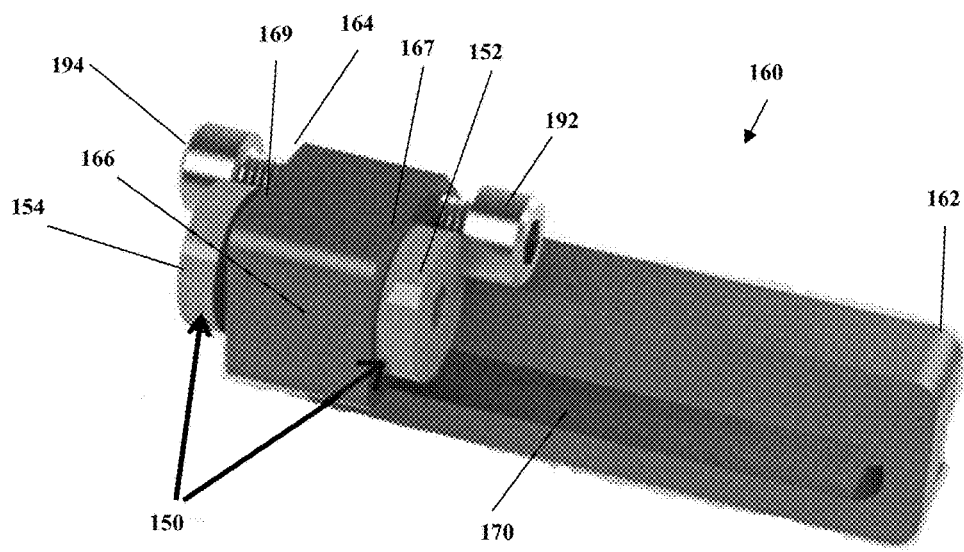
FIG. 3A is a perspective view of the adaptive guide bushing and bushing holder.
Figure 3B:
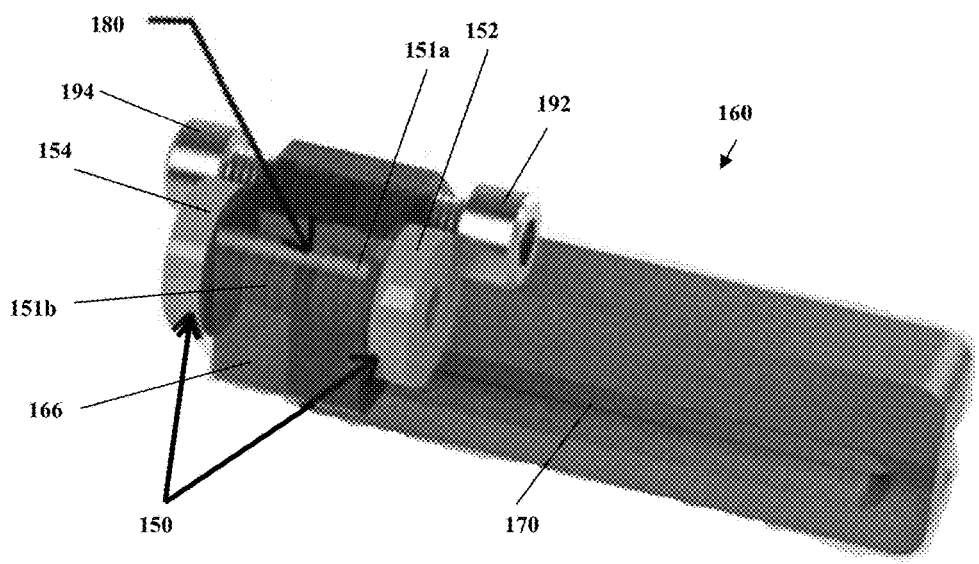
FIG. 3B is a perspective view of the adaptive guide bushing and bushing holder, wherein the raised feature is shown in phantom.
Figure 4A:
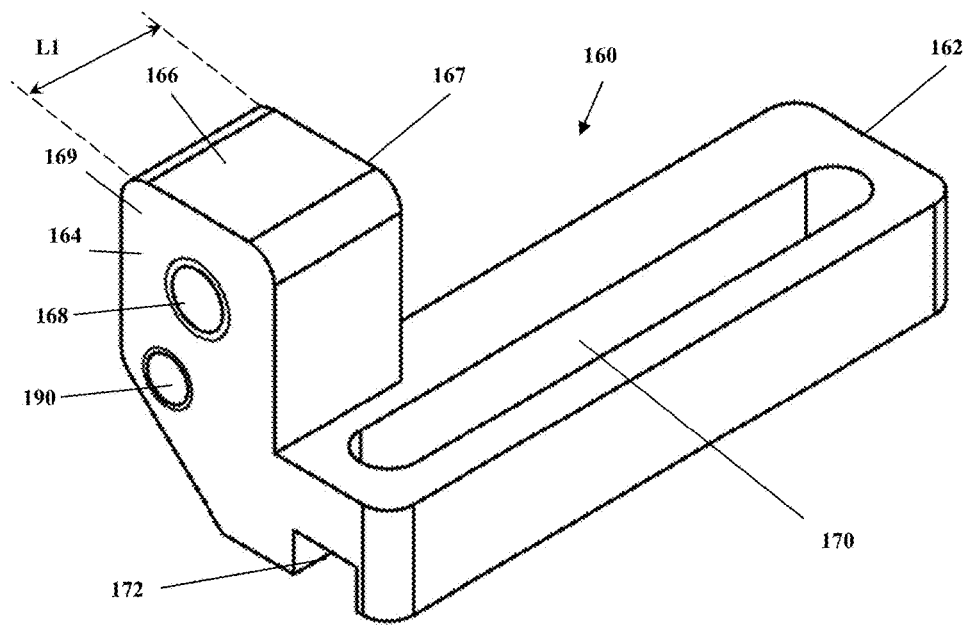
FIG. 4A is a perspective view of the bushing holder, according to one embodiment.
Figure 4B:
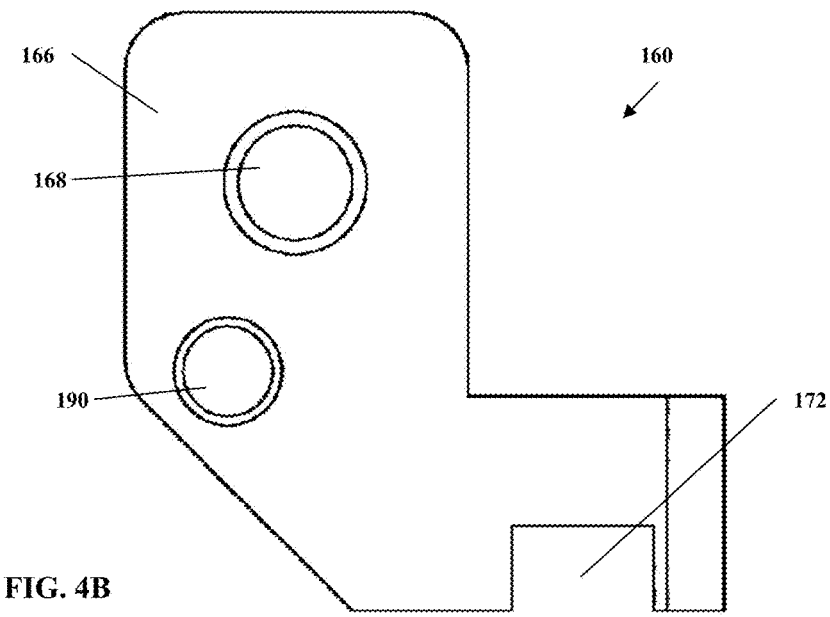
FIG. 4B is a side view of the bushing holder, according to one embodiment.

As shown in FIGS. 3A-3B, the adaptive guide bushing 150 is operably coupled with a bushing holder 160. The adaptive guide bushing 150 includes an elastic material 180 to hold the tubing 200 being laser cut. Utilizing an elastic material 180 that will expand and contract while holding the tubing 200 on center will allow the final product to hold much tighter tolerances. The bushing holder 160 includes a proximal end 162 and a distal end 164, whereby the tubing 200 is advanced from the proximal end 162 to the distal end 164 during the cutting process. The distal end 164 may include a raised holder 166, whereby the adaptive guide bushing 150 is operably coupled through the raised holder 166. As shown in FIGS. 4A-4B, the raised holder 166 includes a proximal end 167 and a distal end 169, and a first opening 168 traversing the proximal end 167 and the distal end 169. The first opening 168 includes a length L1 that traverses thickness of the raised feature 166. In one embodiment, the first opening 168 may include a threaded surface as to operably engage a threaded surface of the guide bushing 150. The bushing holder 160 may include a longitudinal slot 170 and a longitudinal slide 172 for operably coupling the bushing holder 160 to the beam delivery fixture 130, allowing longitudinal displacement of the bushing holder 160. In one embodiment, the raised feature 166 may also include a second opening 190 that is located in proximity to the first opening 168. The second opening 190 may include a threaded surface to operably couple with a first threaded screw cap 192 and a second threaded screw cap 194, as shown in FIGS. 3A-3B. In one embodiment, the first threaded screw cap 192 and the second threaded screw cap 194 operably couple and secure the first bushing 152 and the second bushing 154 in the raised feature 166.

Figure 5A:
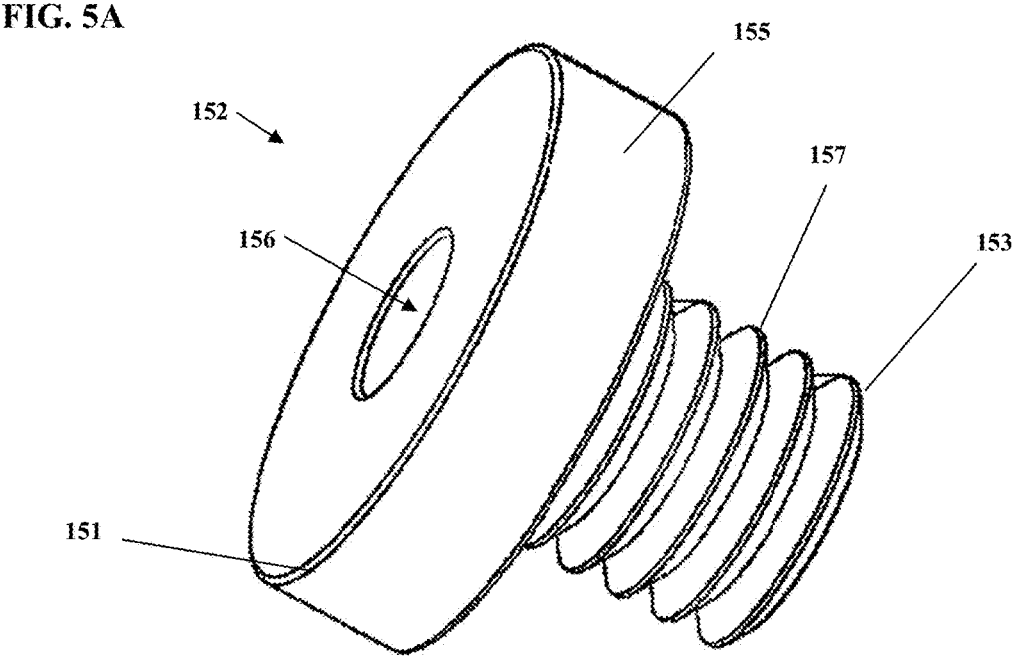
FIG. 5A is a perspective view of the first bushing, according to one embodiment.
Figure 5B:
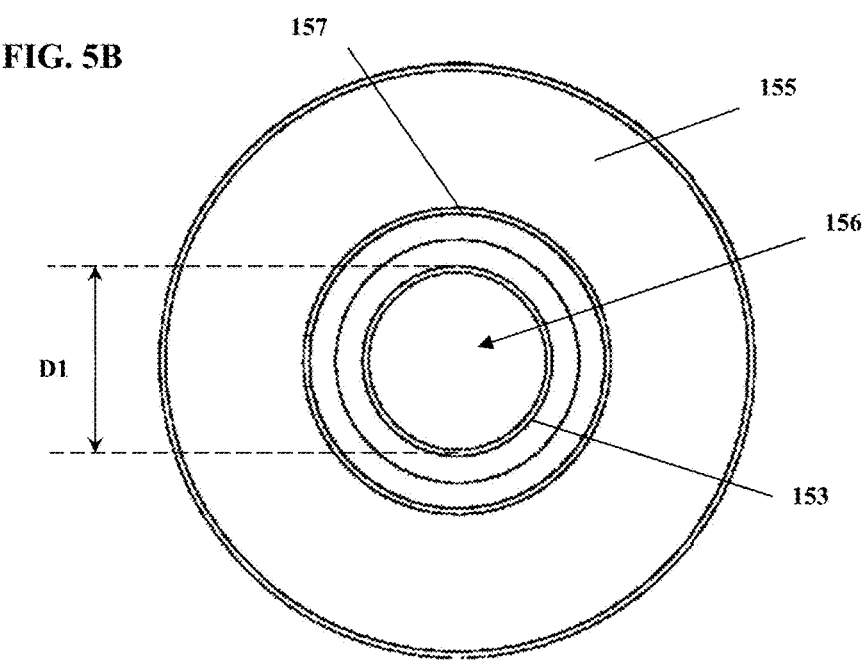
FIG. 5B is a bottom view of the first bushing, according to one embodiment.

The adaptive guide bushing 150 may include a first bushing 152 and a second bushing 154, as shown in FIGS. 3A-3B, wherein the first bushing 152 and the second bushing 154 are substantially identical, and reference will be made below to the first bushing 152 for exemplary purposes. The first and second bushings 152, 154 may each include a first end 151 and a second end 153 with an opening 156 traversing the first end 151 and second end 153, as shown in FIGS. 5A-5B. The first end 151 may include a substantially cylindrical portion 155 and the second end 153 may include a shaft portion 157 extending from the substantially cylindrical portion 155, and the bushing 152, 154 may further comprise an opening 156 which traverses the cylindrical portion 155 and the shaft portion 157. In one embodiment, the shaft portion 157 may be corrugated. In an alternative embodiment, the shaft portion 157 may be threaded as to operably engage the first opening 168, which in some embodiments may also be threaded. The threaded engagement between the shaft portion 157 and the first opening 168 allows the guide bushing 150 to be proximally or distally advanced through the raised feature 166.

As shown in FIGS. 3A-3B, the first end 151 of the first bushing 152 and the second bushing 154 is operably coupled within the first opening 168 of the raised feature 166, such that first end 151a of the first bushing 152 traverses at least a portion of the first opening 168 on the proximal end 167 of the raised feature 166, and the first end 151b of the second bushing 154 traverses at least a portion of the first opening 168 on the distal end 169 of the raised feature 166. The second end 153a of the first bushing 152 abuts the exterior surface of the proximal end 167 of the raised feature 166, while the second end 153b of the second bushing 154 abuts the exterior surface of the distal end 169 of the raised feature 166. In between the second end 153a of the first bushing 152 and the second end of the 153b of the second bushing 154 is disposed an elastic material 180, whereby the elastic material 180 abuts with the second end 153a of the first bushing 152 and the second end 153b of the second bushing 154.

Figure 6A:
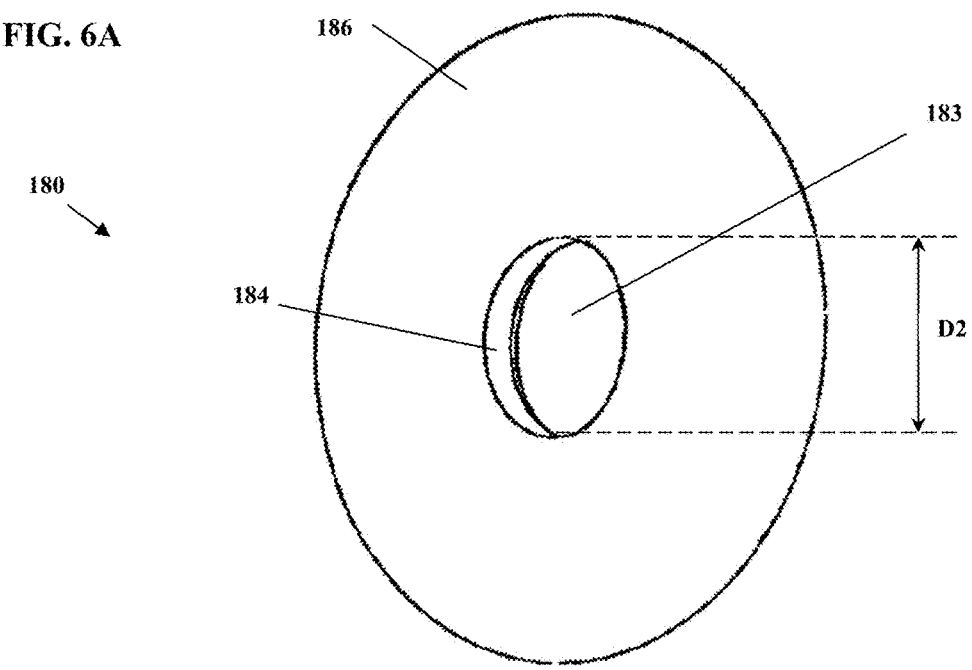
FIG. 6A is a perspective view of the elastic material as an O-ring, according to one embodiment.

As shown in FIG. 5B, the opening 156 in the bushing 152, 154 may include a first inner diameter D1. As shown in FIG. 6A, the elastic material 180 may include an opening 183 coaxially displaced within the center of the elastic material 180. The bushing(s) 152, 154 and elastic material 180 cooperate to form a central opening of the guide bushing 150, through which the tubing 200 is coaxially disposed.

Figure 6B:
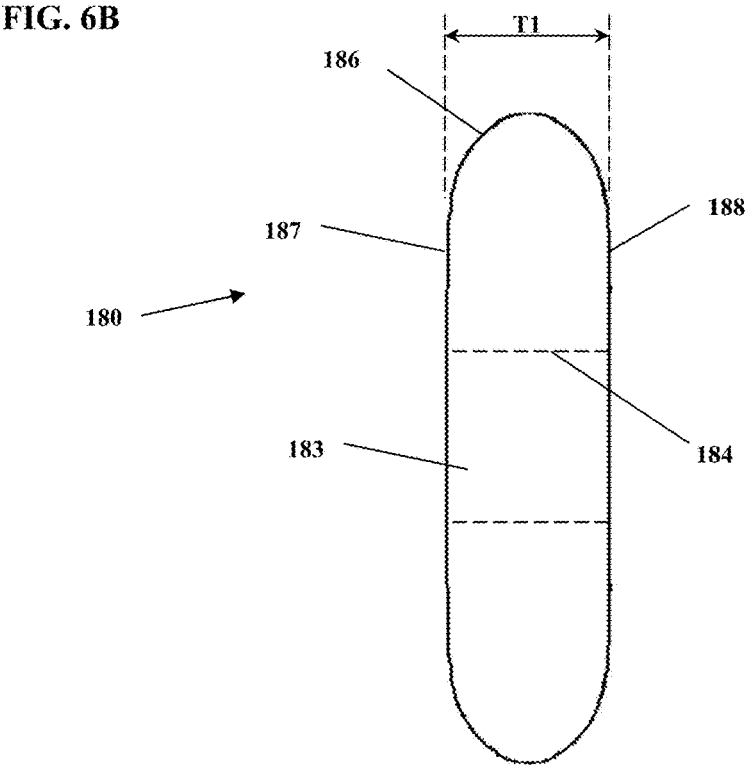
FIG. 6B is a side view of the elastic material as an O-ring, according to one embodiment.

In one embodiment, the elastic material 180 is an O-ring, as shown in FIGS. 6A-6B. The opening 183 is coaxially disposed within the center of the O-ring and includes a central surface 184 around the opening 183 on which to contact and hold the tubing 200. The elastic material 180 may include a generally rounded exterior surface 186. The opening 183 of the elastic material 180 may include a second inner diameter D2, which smaller than the first inner diameter D1 of the first and second bushings 152 and 154. The elastic material 180 may include a first thickness T1, which is traversed by the opening 183. The elastic material 180 may include a first face 187 and a second face 188, whereby the thickness T1 is between the first face 187 and the second face 188. The second inner diameter D2 is decreased in size as the first thickness T1 of the elastic material 180 is compressed or decreased, and the second inner diameter D2 is increased in size as the first thickness T1 of the elastic material 180 is decompressed or increased. This allows the interference between the O-ring 180 and the tubing 200 to be adjusted, increasing or decreasing the friction as desired, while the elastic nature of the O-ring 180 accommodates much larger tube 200 outer diameter variations than traditional methods. The compression (or the decrease) in the thickness T1 of the elastic material 180 may operate by the second ends 153 of the first bushing 152 and the second bushing 154 engaging the first and second faces 187, 188 and compressing the elastic material 180.

A fixed or adjustable cap could be added to hold the O-ring 180 in place. An interference fit between the O-ring 180 and the second ends 153 of the bushings 152, 154 may be tapered to allow for self-centering within the first opening 168 of the raised feature 166.

In an alternative embodiment, the elastic material 180 may be an otherwise relatively low durometer material, such as Nitrile rubber (Buna-N, synthetic rubber copolymer of acrylonitrile (ACN) and butadiene), ethylene propylene diene monomer rubber (EPDM, M-class), polychloroprene synthetic rubbers (Neoprene), Polytetrafluoroethylene rubber (PTFE), fluorocarbon-based synthetic rubber (Fluoroelastomer), fluorocarbon based polymers (Fluoropolymer), Polyurethane, Silicone, or other similar materials.

Figure 6C:
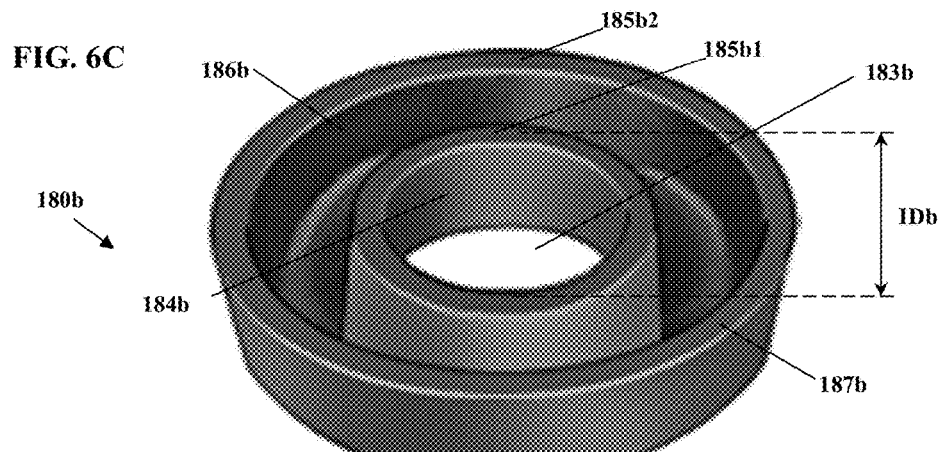
FIG. 6C is a perspective view of the U-cup ring.
Figure 6D:
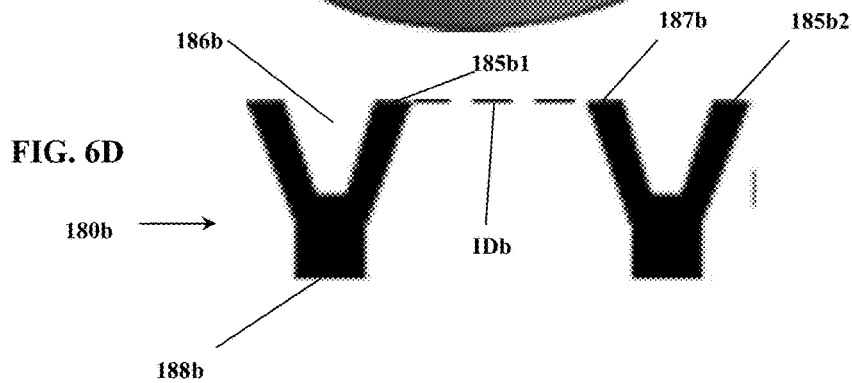
FIG. 6D is a cross-sectional side view of the U-cup ring.
Figure 6E:
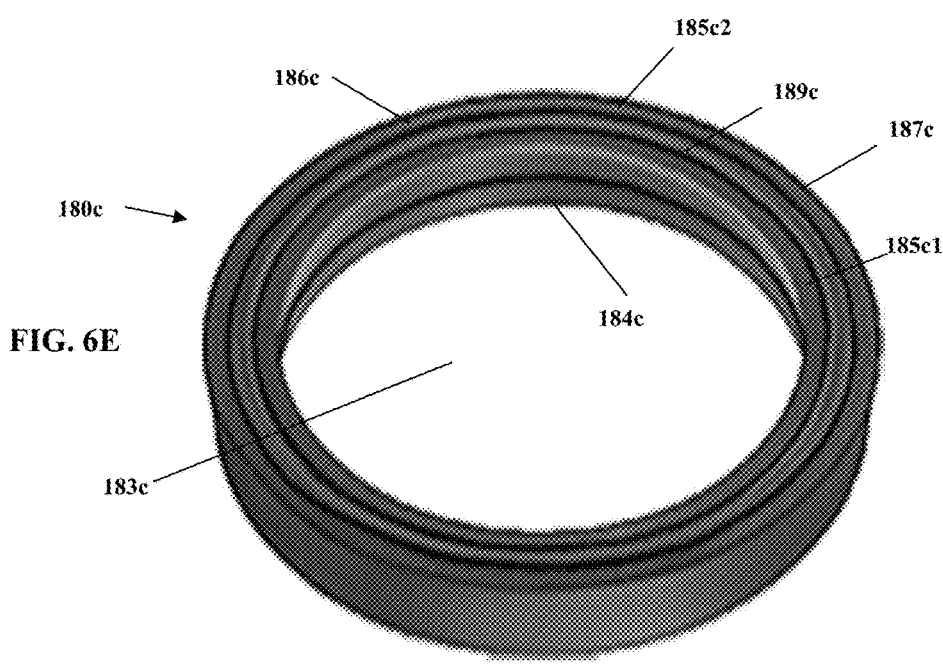
FIG. 6E is a perspective view of the O-ring loaded lip sealed ring.
Figure 6F:
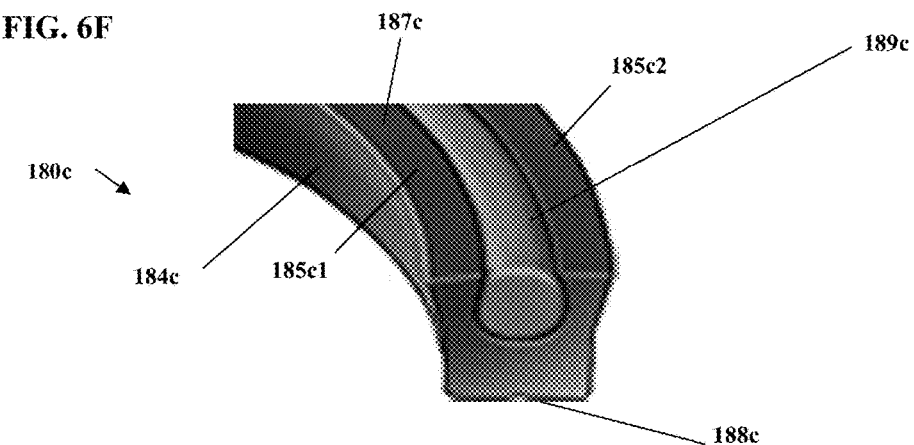
FIG. 6F is an enlarged perspective cross-sectional side view of the O-ring loaded lip sealed ring.
Figure 6G:
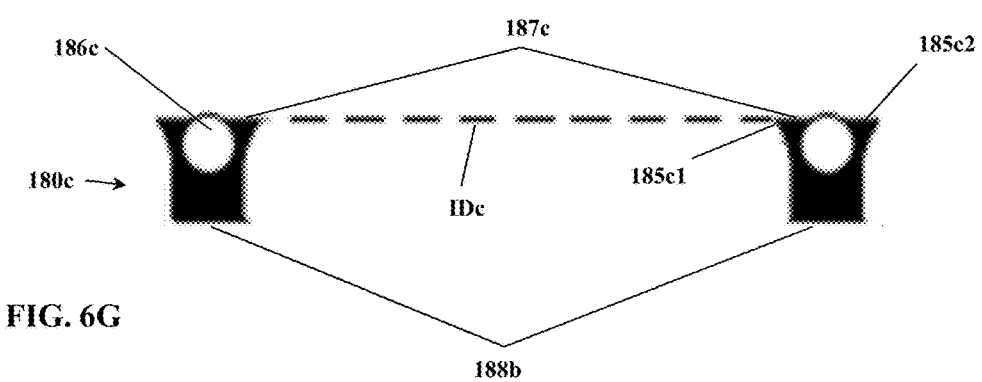
FIG. 6G is a cross-sectional side view of the O-ring loaded lip sealed ring.
Figure 6H:
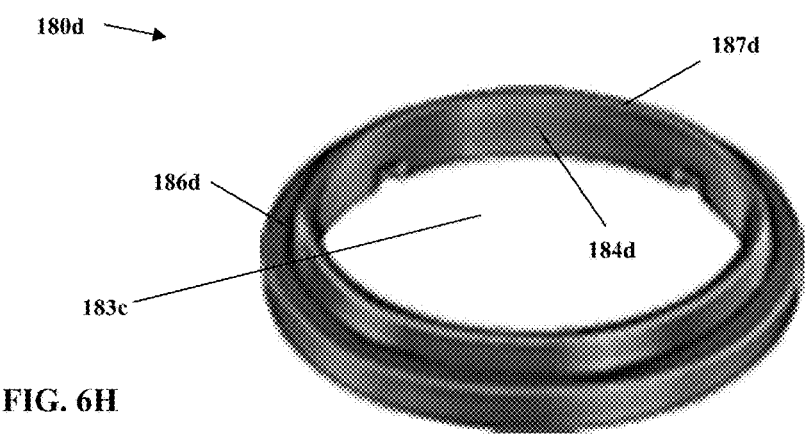
FIG. 6H is a perspective view of the shaft wiper O-ring.
Figure 6I:
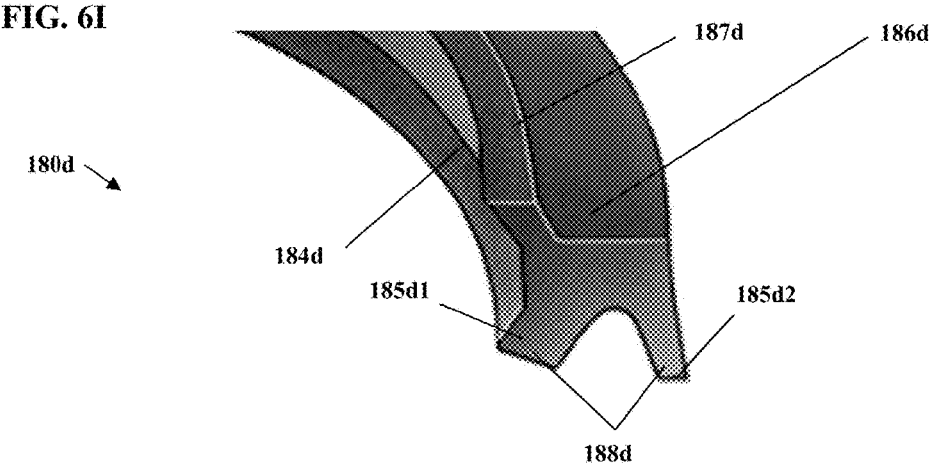
FIG. 6I is an enlarged perspective cross-sectional side view of the shaft wiper O-ring.
Figure 6J:
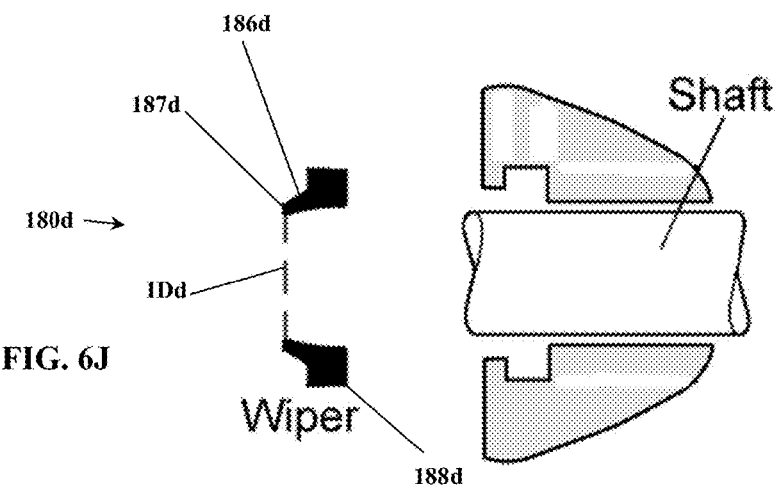
FIG. 6J is a cross-sectional side view of the shaft wiper O-ring coupled with the tubing shaft.
Figure 6K:
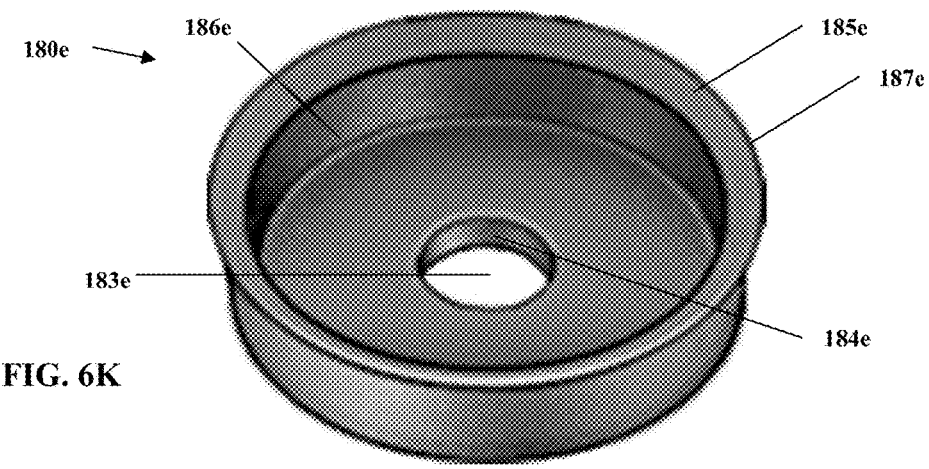
FIG. 6K is a perspective view of the piston cup ring.
Figure 6L:
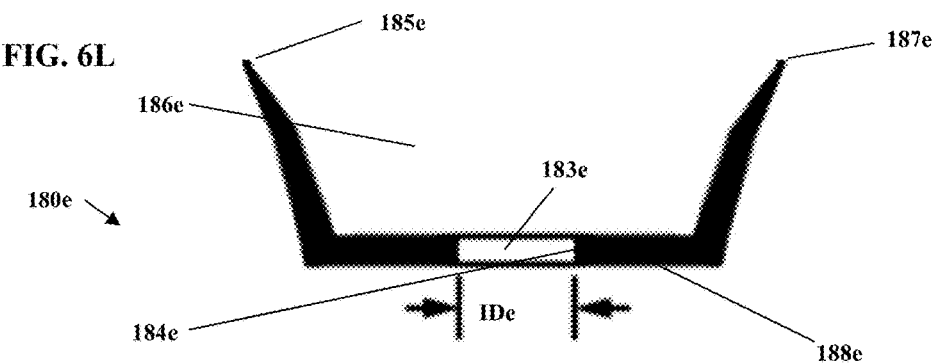
FIG. 6L is a cross-sectional side view of the piston cup ring.
Figure 6M:
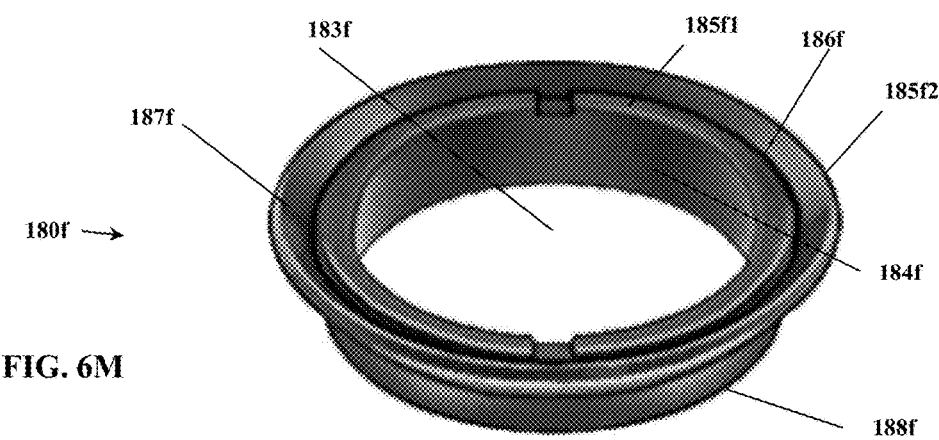
FIG. 6M is a perspective view of the stretch fit rotary shaft ring seal.
Figure 6N:
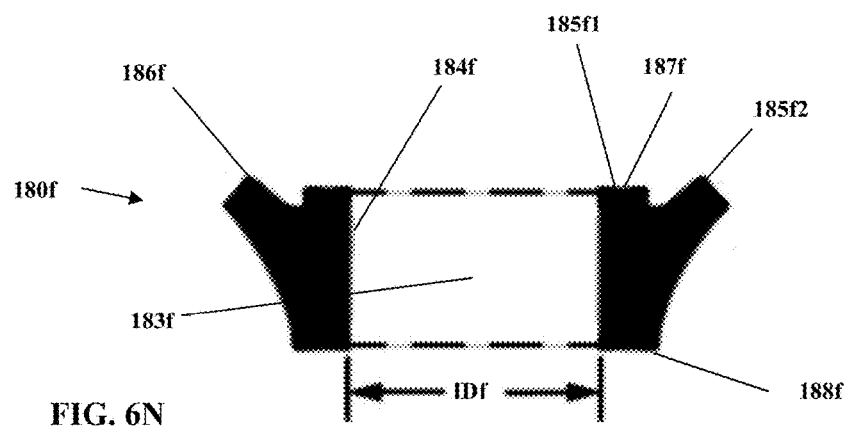
FIG. 6N is a cross-sectional side view of the stretch fit rotary shaft ring seal.
Figure 6O:
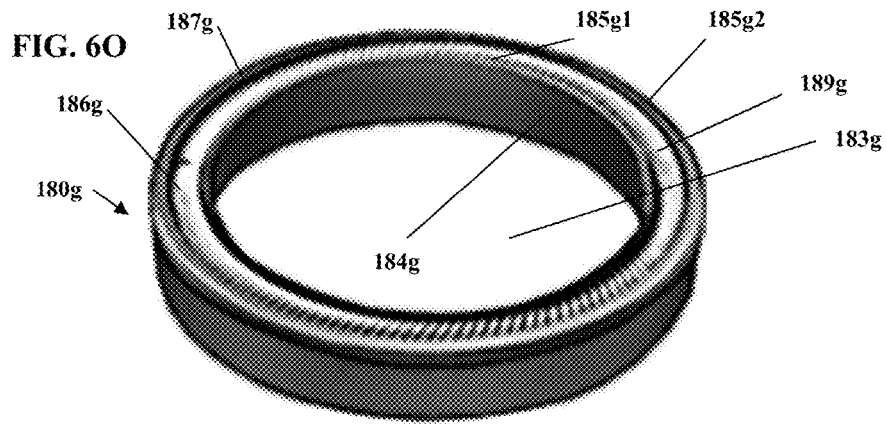
FIG. 6O is a perspective view of the spring loaded shaft seal ring.
Figure 6P:
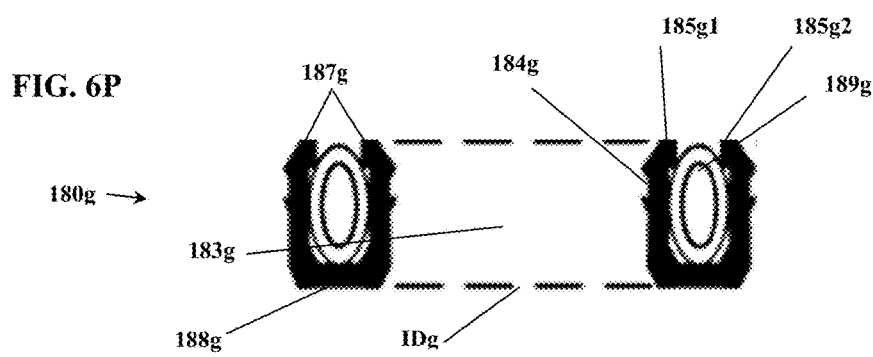
FIG. 6P is a cross-sectional side view of the spring loaded shaft seal ring.
Figure 6Q:
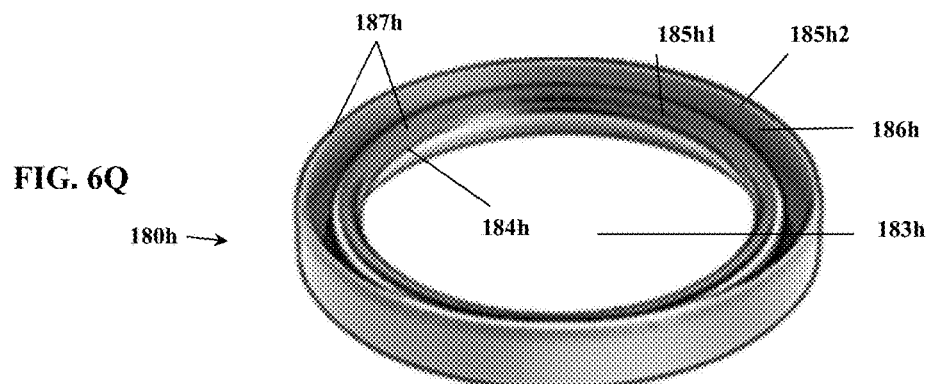
FIG. 6Q is a perspective view of the metal rubber shaft seal ring.
Figure 6R:
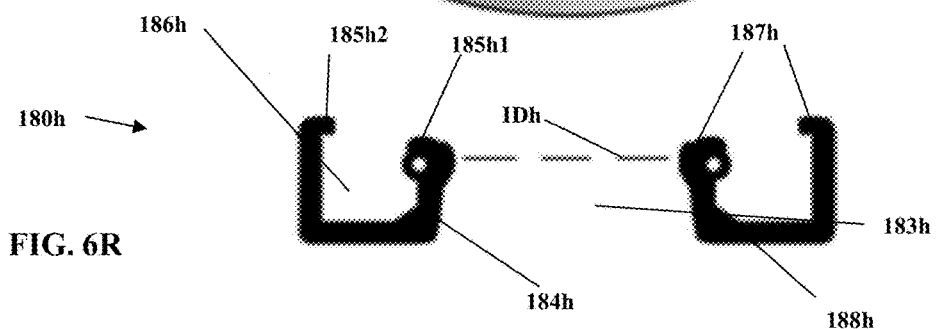
FIG. 6R is a cross-sectional side view of the metal rubber shaft seal ring.
Figure 6S:
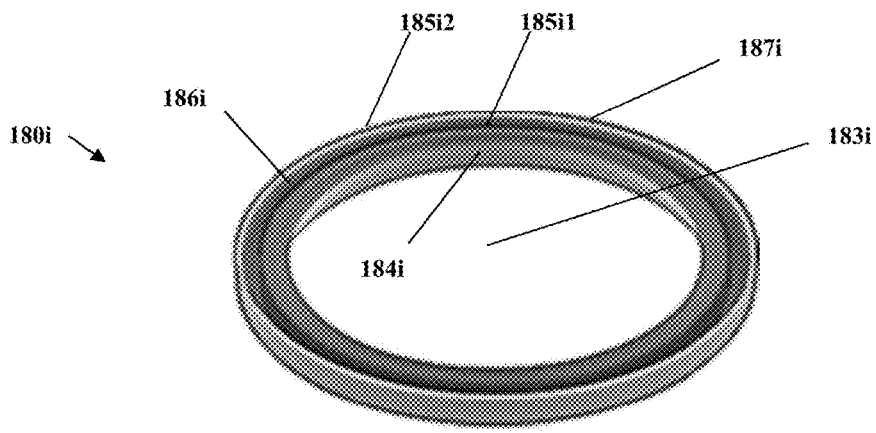
FIG. 6S is a perspective view of the inner shaft seal ring.
Figure 6T:
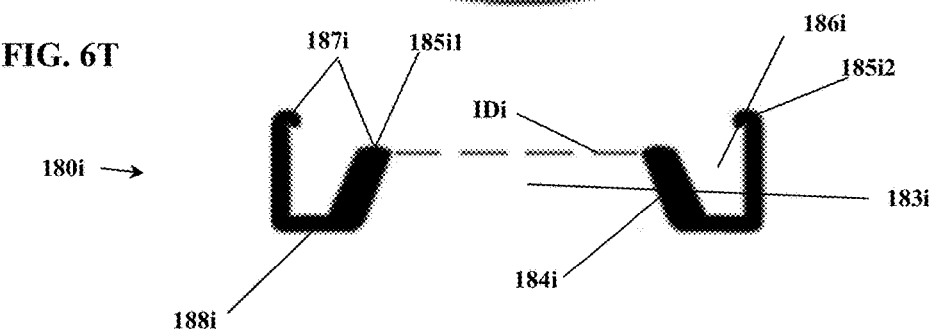
FIG. 6T is a cross-sectional side view of the inner shaft seal ring.
Figure 6U:
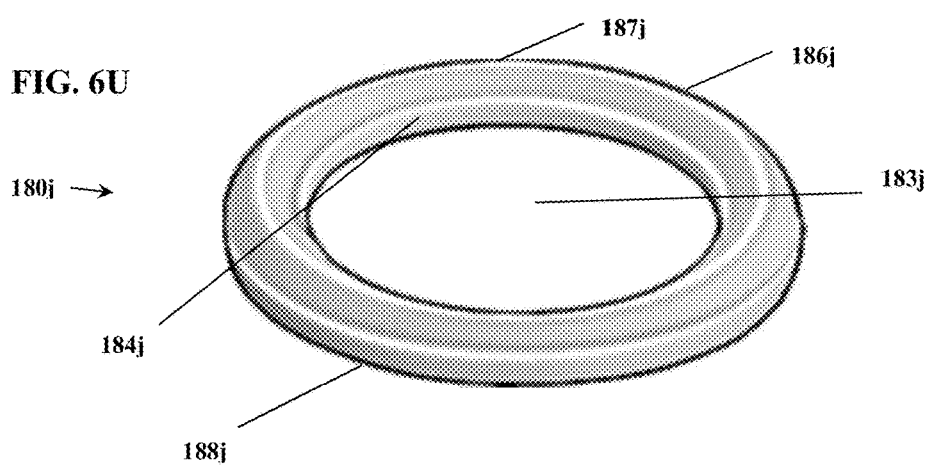
FIG. 6U is a perspective view of the V-ring seal ring.
Figure 6V:
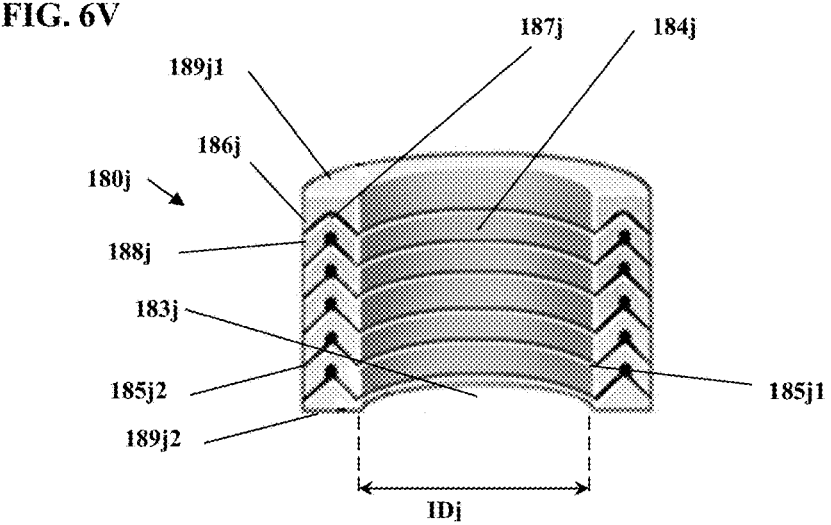
FIG. 6V is a cross-sectional side view of a plurality of the V-ring seal rings in stacked combination.
Figure 6W:
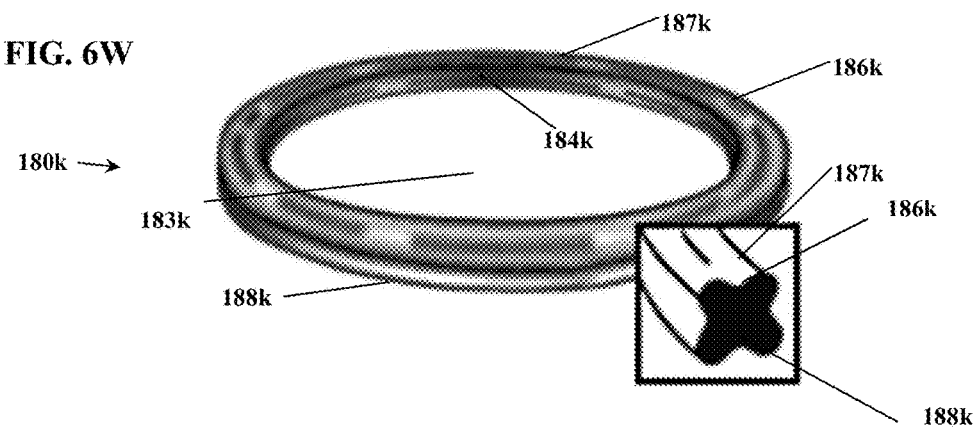
FIG. 6W is a perspective view of the double seal O-ring, including an enlarged cross-sectional side view of the double seal O-ring.

In an alternative embodiment, the elastic material 180 may take the shape of a U-cup ring 180b, an O-ring loaded lip sealed ring 180c, a shaft wiper O-ring 180d, a piston cup ring 180e, a stretch fit rotary shaft seal ring 180f, a spring loaded shaft seal ring 180g, a metal rubber shaft seal ring 180h, an inner shaft seal ring 180i, a V-ring seal ring 180j, or a double seal O-ring 180k, as shown in FIGS. 6C-6W, and/or similar seals.

As shown in FIGS. 6C-6D, the U-cup ring 180b may include a generally U-shaped interior surface 186b, the central opening 183b, and the central surface 184b around the central opening 183b. As shown in FIG. 6D, the generally U-shaped interior surface 186b may include a generally U-shaped cross-section that includes two annular rings 185b1, 185b2 at the first face 187b that end or narrow down to the second face 188b. The first annular ring 185b1 may include an inner diameter IDb.

As shown in FIGS. 6E-6G, the O-ring loaded lip sealed ring 180c may include a generally O-ring shaped interior surface 186c, with an O-ring 189c loaded therein, the central opening 183c, and the central surface 184c about the central axis of the central opening 183c. The generally O-ring shaped interior surface 186c is shown in FIG. 6G. First face 187c may include two annular rings 185c1, 185c2 that end or narrow down to the second face 188c. The first annular ring 185c1 may include an inner diameter IDc.

As shown in FIGS. 6H-6J, the shaft wiper O-ring 180d may include a wiper surface 186d, and a curved central surface 184d about the central opening 183d. The wiper surface 186d may include a curved surface extending to the first face 187d, the curved surface curving towards the central axis of the shaft wiper O-ring 180d, as shown in FIG. 6I. The curved surface can bend away from or towards the central axis of the shaft wiper O-ring 180d. The second face 188d may include two annular rings 185d1, 185d2, where one of the annular rings 185d1 may curve towards the central axis of the shaft wiper O-ring 180d as well. As shown in FIG. 6J, the curved surface of the wiper surface 186d may bend towards the tubing shaft 200 disposed within the central opening 183d.

As shown in FIGS. 6K-6L, the piston cup seal ring 180e may include a central opening 183e with the central surface 184e about the central axis of the opening 183e, with a piston shaped interior surface 186e and a curved lipped first face 187e forming a first annular ring 185e. The central opening 183e may include an inner diameter IDe.

As shown in FIGS. 6M-6N, the stretch fit rotary shaft ring seal 180f may include a central opening 183f and a central surface 184f about the central axis of the opening 183f, and have a generally y-shaped interior surface 186f. The first face 187f may include two annular prongs 185f1, 185f2 extending from the interior surface 186f. The stretch fit rotary shaft ring seal 180f may further include a substantially flat second face 188f. The first annular prong 185f1 may include an inner diameter IDf.

As shown in FIGS. 6O-6P, the spring loaded shaft seal ring 180g may include a central opening 183g and a central surface 184g about the central axis of the opening 183g, and may include a generally U-shaped interior surface 186g with a spring 189g disposed therein. The generally U-shaped interior surface 186g may include two annular rings 185g1, 185g2 at the first face 187g. The height and width of the generally U-shaped interior surface 186g may be adjusted according to the size of the spring 189g to be disposed therein. The first annular ring 185g1 may include an inner diameter IDg.

As shown in FIGS. 6Q-6R, the metal rubber shaft seal ring 180h may include a central opening 183h and a central surface 184h disposed around the central axis of the opening 183h, and may include a generally U-shaped interior surface 186h. In one embodiment, the inner annular ring 185h1 may include a metal garter spring to spring load the inner lip, and the outer annular ring 185h2 may be rubber. In another embodiment, the seal ring 180h may comprise a metal cased seal with a flexible inner lip, or a rubber coated metal case. The inner annular ring 185h1 may have a diameter IDh.

FIGS. 6S-6T show another embodiment of an inner shaft seal ring 180i. The shaft seal ring 180i may include a central opening 183i and a central surface 184i disposed around the central axis of the opening 183i, and may include a generally U-shaped interior surface 186i, and an inner annular ring 185i1 and an outer annular ring 185i2 on the first face 187i. The shaft seal ring 180i may be metal, rubber, or a combination of the two. In one embodiment, the shaft seal ring 180i may comprise a metal case and a rubber inner lip. The inner annular ring 185i1 may have a diameter IDi.

As shown in FIGS. 6U-6V, the V-ring seal ring 180j may include a central opening 183j and a central surface 184j disposed around the central axis of the opening 183j, and may include a generally V-shaped body 186j. The generally V-shaped body may include an upper surface that includes a V forming a first face 187j, and a lower surface that includes a V forming a second face 188j. The second face 188j may include a first annular ring 185j1 and a second annular ring 185j2. As shown in FIG. 6V, a plurality of V-ring seal rings 180j may be placed on top of each other and maintain the same diameter IDj central opening 183j, but the combination may further include a top female adapter 189j1 that includes a substantially flat front face and a bottom male adapter 189j2 that includes a substantially flat bottom face. Multiple V-ring seal rings 180j may be added or removed to adjust the material strength of the elastic material 180.

As shown in FIG. 6W, the double seal O-ring 180k may include a central opening 183k and a central surface 184k disposed about the central axis of the opening 183k, and may include an exterior surface 186k having a generally clover shaped cross-section. The generally clover shaped cross section of the surface 186k is able to form a double seal with the first face 187k and second face 188k of the double seal O-ring 180k, when the ring 180k is expanded or contracted.

Figure 7A:
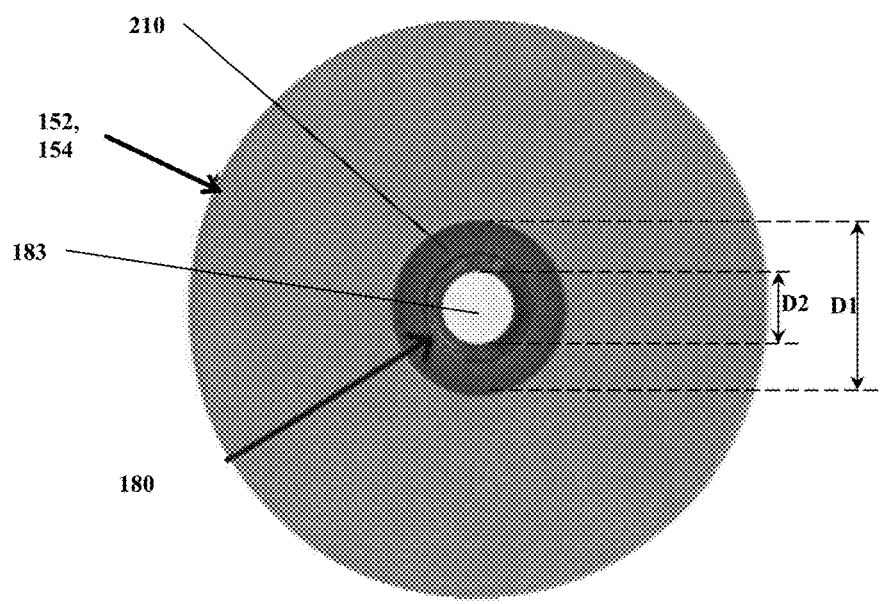
FIG. 7A is a side view of the first bushing coupled with the elastic material as an O-ring and a washer therebetween.
Figure 7B:
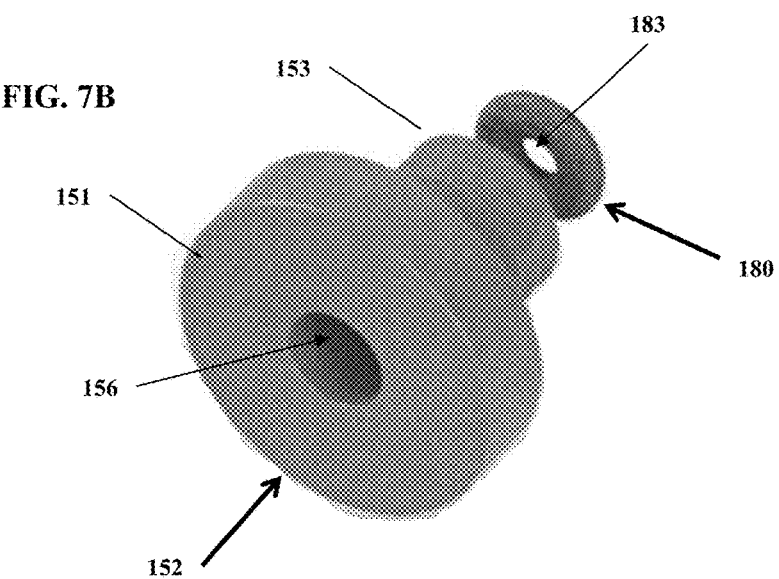
FIG. 7B is a perspective view of the first bushing coupled with the elastic material.
Figure 8A:
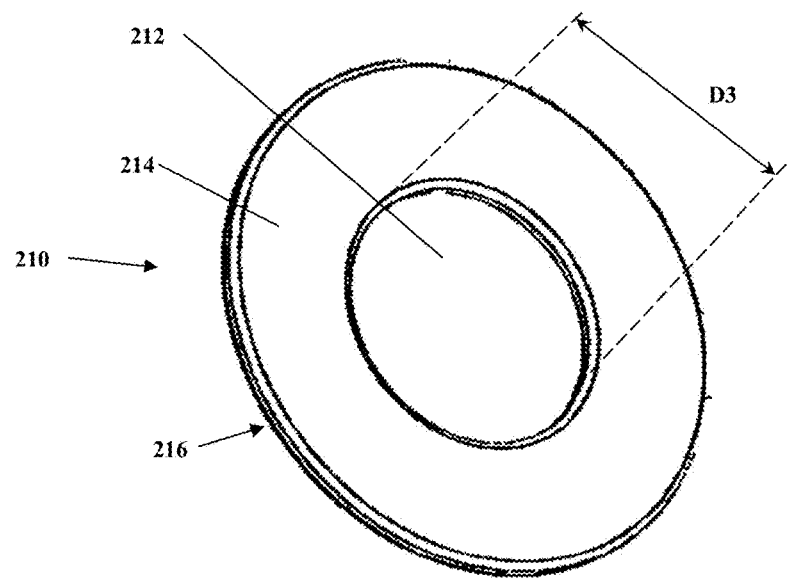
FIG. 8A is a perspective view of a washer.

As shown in FIGS. 7A-7B, the opening 183 of the elastic material 180 may have a diameter D2 which is smaller than the diameter D1 of the opening 156 of the bushing 152, 154. In one embodiment, the second end 153 of the bushings 152, 154 may abut with the first face 187 or second face 188 of the elastic material 180 so as to provide a compressive force on the elastic material 180. In one embodiment, a washer 210 may be placed between the second end 153 of the bushings 152, 154 and the elastic material 180. The washer 210, as shown in FIG. 8A, may include a substantially flat generally cylindrical shape with a central opening 212. The washer 210 may include a first flat surface 214 and a second flat surface 216, with a thickness therebetween. Either the first flat surface 214 or the second flat surface 216 may abut with the second end 153 of the bushings 152, 154 within the first opening 168 of the raised feature 166, while the opposing flat surfaces 214, 216 may abut with the first or second face 187, 188 of the elastic material 180. The central opening 212 of the washer 210 may include a diameter D3 that is smaller than the diameter D1 of the opening 156 of the bushing 152, 154, but larger than the diameter D2 of the opening 183 of the elastic material 180. The flat surfaces 214, 216 of the washer 210 may properly distribute compressive forces over the entire faces 187, 188 of the elastic material 180.

Figure 8B:
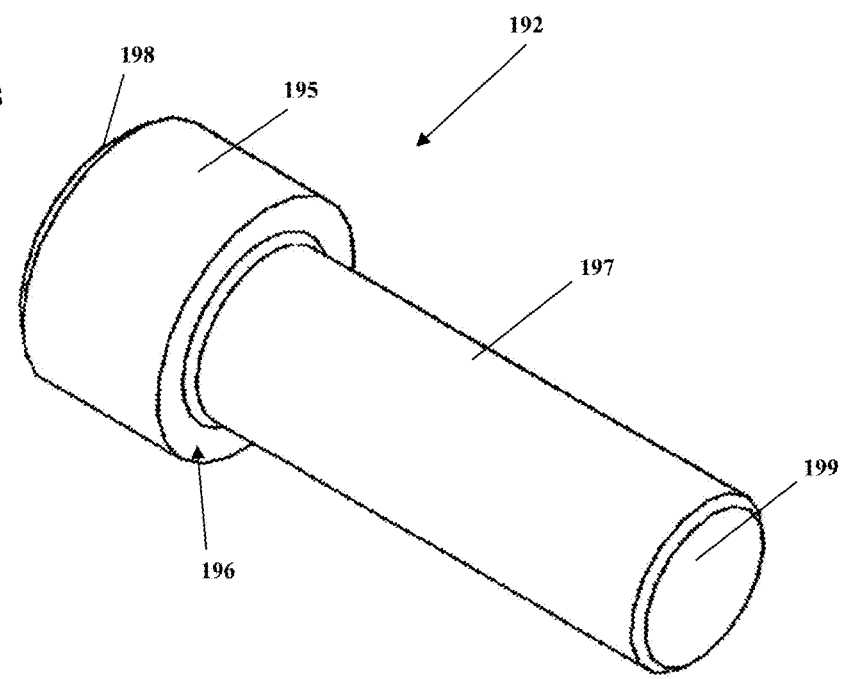
FIG. 8B is a perspective view of a screw cap.

As shown in FIG. 8B, a first screw cap 192 is shown, which may be substantially identical to a second screw cap 194. The screw cap 192 may include a head portion 195 on a proximal end 198 and include a shaft portion 197 extending from the head portion 195 to a distal end 199. The head portion 195 may include a lipped feature 196, which may abut with the top portion of the first end 151 of the bushings 152, 154, as to secure them within the raised feature 166. In one embodiment, the shaft portion 197 may include a threaded exterior surface to be coaxially advanced through the second opening 190, where the second opening 190 may also be threaded.

Figure 9A:
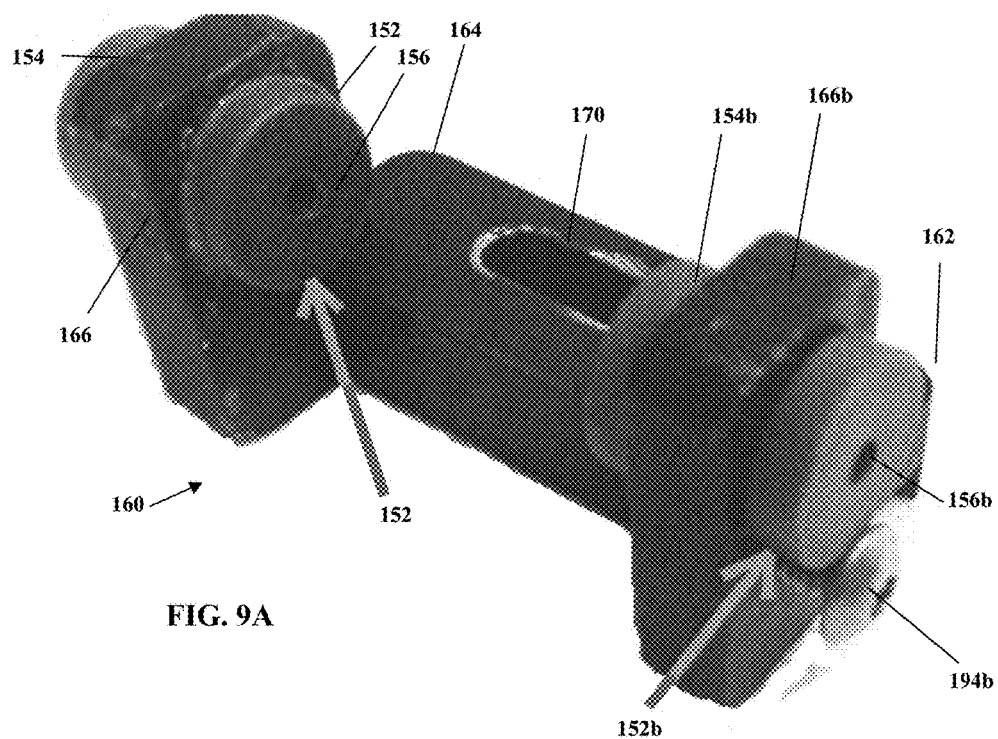
FIG. 9A is a perspective view of an alternative embodiment of the bushing holder with a first and a second raised feature each operably coupled with the first and second bushings.
Figure 9B:
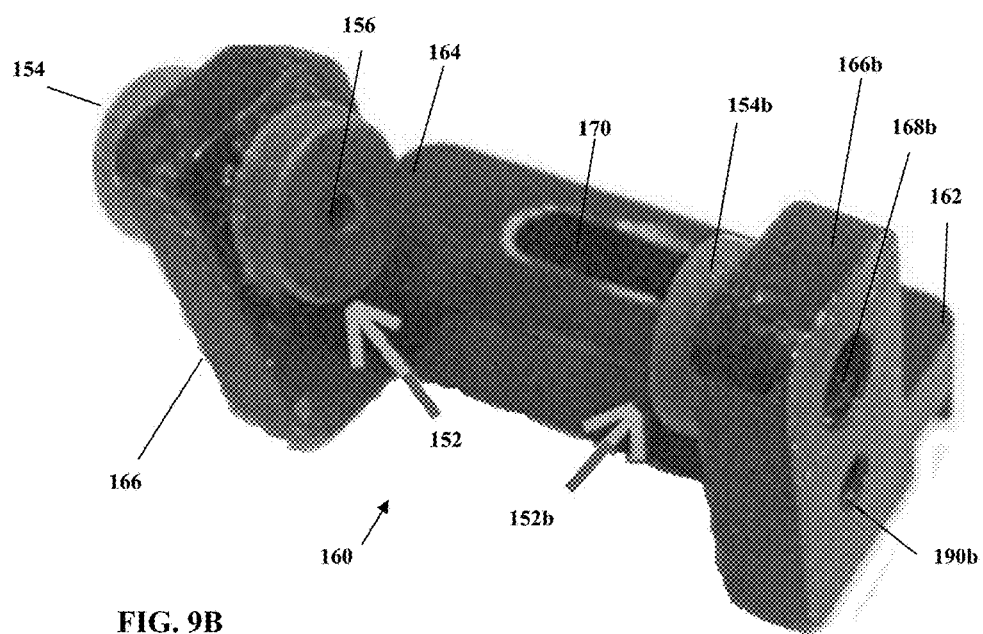
FIG. 9B is a perspective view of the alternative embodiment of the bushing holder of FIG. 9A, wherein the first bushing and screw cap are removed from the second raised feature.

As shown in FIGS. 9A-9B, in some embodiments, the bushing holder 160 may include a second raised feature 166b on the proximal end 162 while the first raised feature 166 remains on the distal end 164. The second raised feature 166b may include the same features as the first raised feature 166, such that the opening 156b of the bushings 152b, 154b on the second raised feature 166b coaxially align along the longitudinal axis of the bushing holder 160 with the opening 156 of the bushings 152, 154 of the first raised feature 166, whereby the tubing 200 will longitudinally extend therebetween. The second raised feature 166b may also include the first opening 168b and the second opening 190b, whereby the bushings 152b, 154b are coaxially displaced in the first opening 168b along with the elastic material 180b, and the screw cap 194b may secure the second bushing 154b.

Figure 10A:
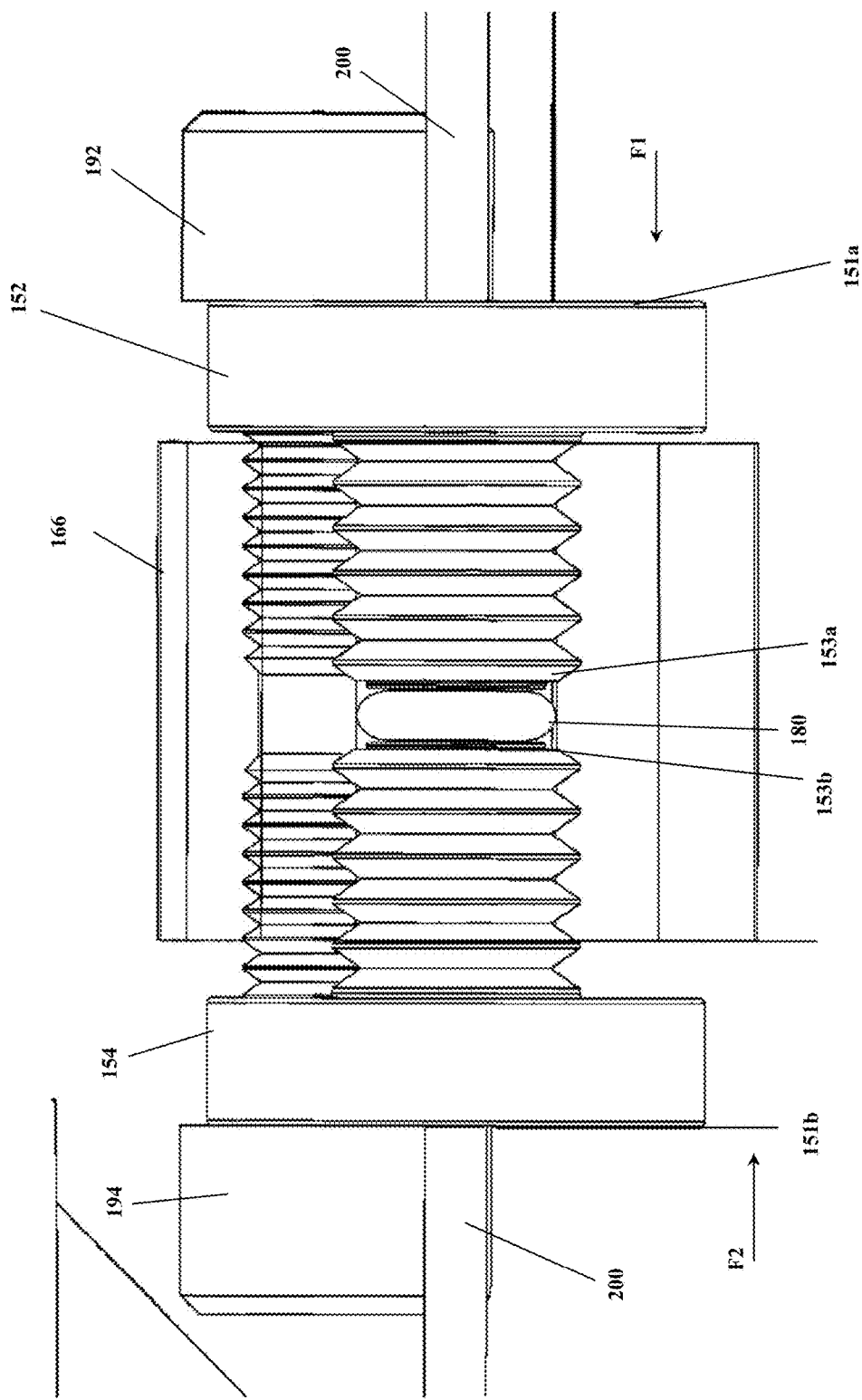
FIG. 10A is a side view of the raised feature including the first and second bushing coupled with the elastic material and the tubing coaxially displaced therein.
Figure 10B:
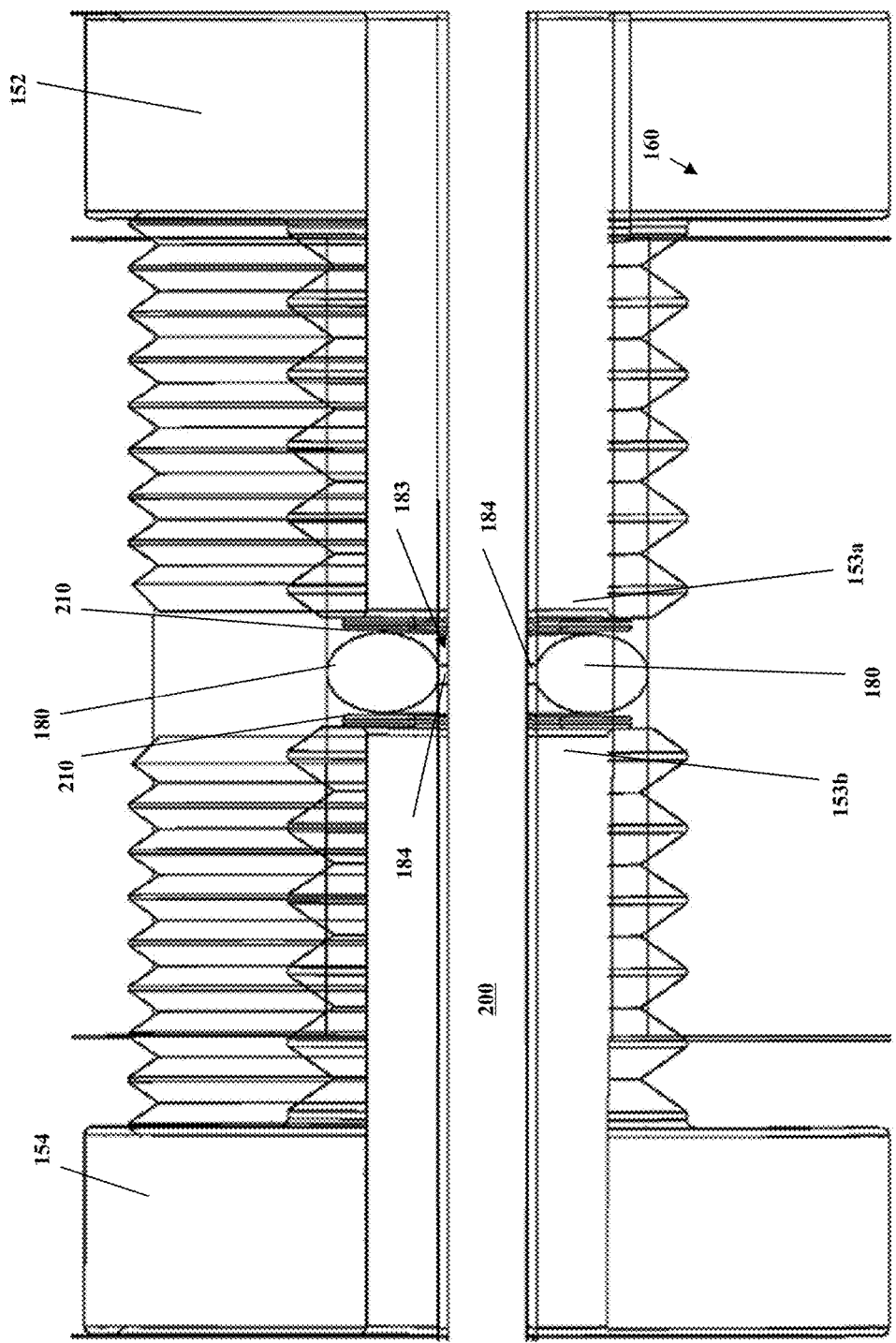
FIG. 10B is a cross-sectional side view of the first and second bushing coupled with the washers and the elastic material with the tubing coaxially displaced therein.

In operation, as shown in FIGS. 10A-10B, the first and second bushings 152, 154 are secured within the raised feature 166 of the bushing holder 160, whereby the elastic material 180 is secured between the second end 153b of the second bushing 154 and the second end 153a of the first bushing 152. The tubing 200 extends through the openings 156 of the bushings 152, 154 and through the opening 183 of the elastic material 180, as shown in FIG. 10B. Optionally, a washer 210 may be place between the elastic material 180 and the second ends 153a, 153b of the first and second bushings 152, 154, respectively. The first bushing 152 may be advanced distally towards the elastic material 180 as to apply a compressive force F1 and, or alternatively, the second bushing 154 may be advanced proximally towards the elastic material 180 as to apply a compressive force F2, whereby either or both compressive forces F1 and F2 may decrease the thickness T1 of the elastic material 180 and compress/decrease the opening 183 and diameter D2 as to force the central surface 184 of the opening 183 to engage with the tubing 200. As shown in FIG. 10A, the first and second caps 192, 194 may secure the first ends 151a, 151b of the bushings 152, 154, respectively, once the elastic material 180 has been properly adjusted or secured by the bushings 152, 154.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A laser cutting system comprising:
an adaptive guide bushing, the adaptive guide bushing comprising:
   a. a bushing holder having a proximal end and a distal end, wherein the distal end of the bushing holder further comprises a raised feature having a proximal end, a distal end, and a first opening traversing a thickness between the proximal end and the distal end of the raised feature;
   b. a first bushing and a second bushing, wherein the first bushing is at least partially disposed within the first opening of the raised feature at the proximal end and the second bushing is at least partially disposed within the first opening of the raised feature at the distal end; and
   c. an elastic member concentrically disposed within the first opening and positioned between and adjacent to each of the first bushing and the second bushing, wherein the elastic member has an aperture with a diameter configured to expand to accommodate tubing and contract to retain the tubing within the first opening.

2. The laser cutting system of claim 1, wherein the adaptive guide bushing further comprises at least one cap member configured to secure the first or second bushing within the raised feature.

3. The laser cutting system of claim 2, wherein the adaptive guide bushing raised feature further comprises a second opening traversing the thickness between the proximal end and the distal end of the raised feature, and the at least one cap member is at least partially disposed within the second opening.

4. The laser cutting system of claim 1, wherein the first or second bushing of the adaptive guide bushing further comprises at least one washer.

5. The laser cutting system of claim 4, wherein the at least one washer of the adaptive guide bushing is disposed between a first face of the elastic member and a second end of one of the first and second bushings.

6. The laser cutting system of claim 1, wherein the elastic member of the adaptive guide bushing includes a first uncompressed state and at least a second compressed state, wherein in the first uncompressed state the elastic member aperture has a first diameter, in the second compressed state the elastic member aperture has a second diameter, and wherein the second diameter is larger than the first diameter.

7. The laser cutting system of claim 1, wherein the first bushing and the second bushing of the adaptive guide bushing each include a first end and a second end with an opening traversing the first end and second end; the first end includes a substantially cylindrical portion and the second end includes a shaft portion extending from the substantially cylindrical portion, through which an opening traverses the cylindrical portion and the shaft portion; and wherein the elastic member is disposed between the shaft portions of the first bushing and the second bushing.

8. The laser cutting system of claim 7, wherein an interference fit between the second ends of the first and second bushings of the adaptive guide bushing and the elastic member of the adaptive guide bushing is tapered.

9. The laser cutting system of claim 8, wherein the tapered interference fit is configured to self-center the elastic member within the first opening of the raised feature.

10. The laser cutting system of claim 1, wherein the proximal end of the bushing holder of the adaptive guide bushing further comprises a second raised feature having a proximal end, a distal end, and a first opening traversing a thickness between the proximal end and the distal end of the second raised feature.

11. The laser cutting system of claim 10, further comprising a third bushing, a fourth bushing, and a second elastic member, wherein the third bushing is at least partially disposed within the first opening of the second raised feature at the proximal end and the fourth bushing is at least partially disposed within the first opening of the second raised feature at the distal end, and wherein the third bushing and fourth bushing are coaxially aligned with the first bushing and second bushing and configured to retain the tubing within a central opening disposed through a length of the second guide bushing.

12. The laser cutting system of claim 1, wherein the elastic member of the adaptive guide bushing includes a shape selected from the group consisting of: an O-ring, a U-cup ring, an O-ring loaded lip sealed ring, a shaft wiper O-ring, a piston cup ring, a stretch fit rotary shaft seal ring, a spring loaded shaft seal ring, a metal rubber shaft seal ring, an inner shaft seal ring, a V-ring seal ring, and a double seal O-ring.

* * * * *